(12) United States Patent
Wu et al.

(10) Patent No.: US 7,022,428 B2
(45) Date of Patent: Apr. 4, 2006

(54) LOW EQUIVALENT WEIGHT IONOMER

(75) Inventors: Huey Shen Wu, Newark, DE (US); Charles W. Martin, Avondale, PA (US); Xin Kang Chen, Shanghai (CN)

(73) Assignee: Gore Enterprise Holdings, Inc., Newark, DE (US)

( * ) Notice: Subject to any disclaimer, the term of this patent is extended or adjusted under 35 U.S.C. 154(b) by 0 days.

(21) Appl. No.: 11/038,307

(22) Filed: Jan. 20, 2005

(65) Prior Publication Data
US 2005/0165186 A1  Jul. 28, 2005

Related U.S. Application Data

(62) Division of application No. 10/011,242, filed on Dec. 6, 2001, now Pat. No. 6,861,489.

(51) Int. Cl.
*H01M 8/10* (2006.01)

(52) U.S. Cl. .................. 429/33; 442/171; 526/247; 526/242; 526/213; 204/296; 429/30

(58) Field of Classification Search ................ 526/247, 526/242, 213; 204/296; 429/30, 33; 442/171
See application file for complete search history.

(56) References Cited

U.S. PATENT DOCUMENTS

| | | | |
|---|---|---|---|
| 3,282,875 A | 11/1966 | Connolly et al. | 260/29.6 |
| 3,291,843 A | 12/1966 | Fritz et al. | 260/614 |
| 3,310,606 A * | 3/1967 | Fritz | 525/276 |
| 4,358,545 A | 11/1982 | Ezzell et al. | 521/27 |
| 4,417,969 A | 11/1983 | Ezzell et al. | 204/252 |
| 4,478,695 A | 10/1984 | Ezzell et al. | 204/98 |
| 4,661,411 A | 4/1987 | Martin et al. | 428/421 |
| 4,940,525 A | 7/1990 | Ezzell et al. | 204/252 |
| 5,082,472 A | 1/1992 | Mallouk et al. | 55/16 |
| 5,246,792 A | 9/1993 | Watanabe | 429/33 |
| 5,264,508 A | 11/1993 | Ishibe et al. | 526/427 |
| 5,350,497 A | 9/1994 | Hung et al. | 204/157.92 |
| 5,393,852 A | 2/1995 | Ishibe et al. | 526/427 |
| 5,463,005 A | 10/1995 | Desmarteau | 526/240 |

(Continued)

FOREIGN PATENT DOCUMENTS

DE   2650979 A  *  5/1978

(Continued)

OTHER PUBLICATIONS

"Perfluorinated Resin Sulfonic Acid (Nafion-H) Catalyis in Synthesis", by G. Olah, P. Iyer, and P.Surya, in Journal: Synthesis (Stuttgart), 1986 (7) 513-531 (Translation).

(Continued)

*Primary Examiner*—David W. Wu
*Assistant Examiner*—Henry S. Hu
(74) *Attorney, Agent, or Firm*—Allan M. Wheatcraft

(57) ABSTRACT

An ionomer and a process for forming the ionomer such that the ionomer has (1) low equivalent weight; below 950, preferably between 625 and 850, and most preferably between about 700 and about 800; and (2) high conductivity, (greater than 0.15 S/cm). In an alternative embodiment, the ionomer has (1) low equivalent weight; below 950, preferably between 625 and 850, and most preferably between about 700 and about 800; and (2) acceptably low hydration, (less than about 75 weight percent). These ionomers are adapted to be processed into thin films that have acceptable physical stability. They are thus extremely well-suited for low humidity or high temperature fuel cell applications.

10 Claims, 6 Drawing Sheets

U.S. PATENT DOCUMENTS

| | | | |
|---|---|---|---|
| 5,508,330 A * | 4/1996 | Coughlin et al. | 524/251 |
| 5,547,551 A | 8/1996 | Bahar et al. | 204/296 |
| 5,599,614 A | 2/1997 | Bahar et al. | 442/174 |
| 5,608,022 A * | 3/1997 | Nakayama et al. | 526/212 |
| 5,654,109 A | 8/1997 | Plowman et al. | 429/13 |
| 5,718,947 A | 2/1998 | Martin et al. | 427/243 |
| 5,981,097 A | 11/1999 | Rajendran | 429/33 |
| 6,046,271 A | 4/2000 | Wu et al. | 524/742 |
| 6,054,230 A | 4/2000 | Kato | 429/33 |
| 6,156,451 A | 12/2000 | Banerjee et al. | 429/134 |
| 6,248,469 B1 * | 6/2001 | Formato et al. | 429/41 |
| 6,255,536 B1 | 7/2001 | Worm et al. | 568/615 |
| RE37,307 E | 8/2001 | Bahar et al. | 240/296 |
| 6,388,139 B1 * | 5/2002 | Resnick | 568/32 |
| 6,576,100 B1 * | 6/2003 | Arcella et al. | 204/296 |

FOREIGN PATENT DOCUMENTS

| | | |
|---|---|---|
| EP | 1 179 548 A1 | 2/2002 |
| GB | 1550874 | 8/1979 |
| GB | 1550874 A * | 8/1979 |
| WO | WO 90/15828 | 12/1990 |
| WO | WO 94/03503 | 2/1994 |
| WO | WO 99/52954 | 10/1999 |
| WO | WO 00/24709 | 5/2000 |
| WO | WO 00/52060 | 9/2000 |
| WO | WO 00/79629 | 12/2000 |
| WO | WO-03/050150 A1 * | 6/2003 |

OTHER PUBLICATIONS

"Perfluorinated Resin Sulfonic Acid (Nafion-H) Catalysis in Organic Synthesis" by T. Yamato in Yuki Gosei Kagaku Kyokaishi/Journal of Synthetic Organic Chemistry, vol. 53, No. 6, Jun. 1995, pp. 487-499.

"The Use of Nafion 415 Membrane in Copper Electrowinning from Chloride Solution" by R. Raudseppand M. Vreugde, in CIM Bulletin, 1982 V75, N842, P122.

"Mini-Emulsion Polymerization" by E. David Sudol and Mahamed S. El-Aasser, in "Emulsion Polymerzation and Emulsion Polymers," P.A. Lowell and M.S. El-Aasser, John Wiley and Sons, Ltd., New York 1997, pp. 700-709.

"Characterization of Polymer Electrolytes for Fue I Cell Applications," T. Zawodzinski, T. Springer, F. Uribe and S. Gottesfeld, Solid State Ionics, vol. 60, p. 199 (1993).

"Investigation of the Proton Transport in Nafioni Membranes as a Function of Direction, Temperautre and Relative Humidity," G. Blumenthal, M. Cappadonia, and M Lehmann,Ionics, vol. 2, p. 102-106 (1996).

"Chemical and Morphological Proerties of Solution-Cast Perfluorosulfonate Ionomers," by R. Moore and C. Martin, Macromolecules, vol. 21, No. 5, 1988, p. 1334-1339.

"Morphology and Chemical Properties of the Dow Perfluorosulfulnate Ionomers," R. Moore and C. Martin, Macromolecules 1989, vol. 22, pp 3594-3599 (1994)

"Water Uptake by and Tramsport Through Nafion 117 Membranes," T. Zawodzinski, C. Derouin, S. Radzinski, R. Sherman, V. Smith, T. Springer, and S. Gottesfeld, Journal of the Elctrochemical Society, vol. 140, No. 4, 1041-1047.

Product Literature from Perma Pure, Inc., Toms River, NJ copyright 2000.

Product Literature on Nafion from DuPont Fluoroproducts, Fayetteville, NC 28306 (Sep. 2001).

"Uber Erstarrungs and Quellengserscheinungen vo Gelatine", Paul Schroeder, Z Physik Chem., vol. 75 (1903) p. 75.

"Perfluorosulphonic Acid (Nafion) Membrane as a Separator for an Advanced Alkaline Water Electrolyser" R. Yen, J. McBreen, G. Kissel, F.Kulesa, and S. Srinivasan, Journal of Applied Eelctrochemisty, vol. 10 (1980) p. 741-747.

* cited by examiner

LOW EQUIVALENT WEIGHT IONOMER

RELATED APPLICATION

The present application is a divisional application of U.S. patent application Ser. No. 10/011,242, filed Dec. 6, 2001 now U.S. Pat. No. 6,861,489.

FIELD OF THE INVENTION

The present application relates to fluorinated ionomers, and specifically to fluorinated ionomers of low equivalent weight that have relatively low hydration and can be processed into thin films. The fluorinated ionomers are preferably perfluorinated compounds suitable for applications where reasonably high ionic conductivity in low humidity environments is desirable. One such application is in solid polymer electrolyte fuel cells.

BACKGROUND OF THE INVENTION

Solid polymer ionic membranes or films have been well known in the art for many years. These polymers are typically characterized by high ionic conductivity, i.e., the rapid transport of ionic species, e.g., protons, at relatively modest temperatures, e.g., 50–90 degrees C. Additionally, it is desirable for such ionically conducting polymers to be made in the form of membranes or thin films. In so doing, the resistance to ionic transport, which is a function of the film thickness, can be reduced. Fluoropolymer compositions are particularly desirable for such uses, and are disclosed, for example, in U.S. Pat. Nos. 3,282,875, U.S. Pat. No. 4,358,545 and U.S. Pat. No. 4,940,525.

The instant invention relates to ionomers, which as used herein means a perfluorinated polymer containing acid groups or acid derivatives easily converted to acid groups such that the acid form of the polymer in membrane form has a room temperature ionic conductivity greater than $1 \times 10^{-6}$ S/cm. As used herein the acid form of an ionomer means that substantially all the ion exchange groups, e.g., $SO_3^-$ or sulfonic groups, are protonated. One important parameter used to characterize ionomers is the equivalent weight. Within this application, the equivalent weight (EW) is defined to be the weight of the polymer in acid form required to neutralize one equivalent of NaOH. As is known in the art, one can also convert the equivalent weight into other parameters that may be useful. For example the ion exchange capacity, which is 1000 divided by the equivalent weight; or the mole fraction or mole percent of ionomer in a copolymer of ionomer and non-ionomer. Higher EW means that there are fewer active ionic species (e.g., protons) present. If it takes more of the polymer to neutralize one equivalent of hydroxyl ions there must be fewer active ionic species within the polymer. Because the ionic conductivity is generally proportional to the number of active ionic species in the polymer, one would therefore like to lower the EW in order to increase conductivity.

Lowering the equivalent weight has previously not been a practical approach to making useful membranes. This is because with fluoropolymers currently known, as the equivalent weight goes down, the amount of water (or solvent) that the polymer absorbs goes up. The amount of water absorbed by the polymer is called the degree of hydration or hydration. It is expressed as the weight percent of water absorbed by the polymer under a given set of conditions, for example, after immersion in room temperature water for two hours. A higher degree of hydration is desirable up to a point because it tends to increase the ionic conductivity of the membrane. Correspondingly, lowering the degree of hydration has traditionally meant decreasing the conductivity. But there is a limit to the amount of water or solvent such fluoropolymer membranes can contain. If too much water is present, the film may lose much of its physical integrity, becoming gel-like with little or no rigidity. In the extreme, the polymer may completely disintegrate. In addition, depending on the exact polymer composition, low EW fluoropolymer ionomers may even partially or completely dissolve in water. Furthermore, even if the films were to be stable, too high a hydration would tend to dilute the number of ions present for conduction, thereby lowering the conductivity. Thus, there is an optimal degree of hydration that is high enough to provide the highest possible conductivity, while not so high that the films become physically unstable when hydrated.

Thus, one would like to decrease the equivalent weight of these fluoropolymers to increase their conductivity, but heretofore could not practically do so because the degree of hydration and/or water solubility was too high to form practical membranes.

Various approaches have been used to circumvent this limitation. In U.S. Pat. No. 5,654,109, U.S. Pat. No. 5,246,792, U.S. Pat. No. 5,981,097, U.S. Pat. No. 6,156,451, and U.S. Pat. No. 5,082,472 various forms of layered composite membranes are suggested. In '109, the use of a bilayer or trilayer composite ion exchange membranes is suggested where the outer layer or layers are lower equivalent weight for improved electrical performance, while the core layer has a higher EW that provides strength. A similar approach is suggested in '792 but the films are layers are characterized by their glass transition temperatures instead of EW. Three or more layers with variable ion exchange ratio (a parameter proportional to EW) is proposed in '097. In '472 a process to form a membrane is taught whereby a perfluorinated ionomer is laminated to a porous expanded PTFE membrane, followed by impregnation of a low equivalent weight ionomer (e.g., 920–950 EW) into that laminate. Because the impregnation is performed with a solution with low solids content (e.g., 2%), the amount of low equivalent weight material in the final product is relatively low. Although each of these approaches may offer some improvement over a monolithic single layer fluoropolymer membrane, they all involve the use of rather complex, composite, multilayer structures that can be difficult and/or expensive to process.

Approaches to modifying the fluoropolymer itself have also been taught, for example in U.S. Pat. No. 4,358,545 to Ezzell. The properties of these polymers are described in Moore and Martin, "Morphology and Chemical Properties of the Dow Perfluorosulfonate Ionomers", Macromolecules, vol. 22, pp. 3594–3599 (1989), and Moore and Martin, "Chemical and Morphological Properties of Solution-Cast Perfluorosulfonate Ionomers", Macromolecules, vol. 21, pp. 1334–1339 (1988). The approach described in these references is to produce ionomers with shorter side chains along the polymer backbone. This approach is particularly desirable for use in coating processes (for example, as described in U.S. Pat. No. 4,661,411 and U.S. Pat. No. 5,718,947), but still suffers limitations for use as fluoropolymer ionomer membranes. In particular, these polymers can still be difficult to form into acceptably thin, strong membranes from solution.

Another approach as described by various authors is to form co-polymers of tetrafluoroethylene and ionomers using variations of the well-known emulsion polymerization (for example, the process disclosed in U.S. Pat. No. 3,282,875).

In U.S. Pat. No. 5,608,022 to Nakayama et. al. and WO 00/52060 to Bekarian, et. al., processes are taught to form functionalized, fluorinated co-polymers by dispersing fine droplets of a fluorinated co-monomer before polymerizing with a traditional fluorine containing monomer, e.g. tetrafluoroethylene. In these processes, the formation of fine droplets of the co-monomer is a key to a successful preparation of the polymer. In WO 94/03503 to Barnes, et. al. the rate of addition of the tetrafluoroethylene monomer to the ionomer emulsion is controlled by either altering the concentration of the emulsion during polymerization, varying the pressure of the tetrafluoroethylene gas during reaction, or varying the agitation of the reaction mixture. Barnes teaches that these approaches result in a product with higher utilization of the ionomer as determined by the property of equivalent weight distribution, which he defines as a ratio of EW determined by means of titration to that determined by nuclear magnetic resonance. Barnes et. al. Claims that this higher utilization leads to a higher Relative Hydration Product and higher Specific Conductivity. Both these parameters were evaluated in the presence of 2.5 Molar sulfuric acid (2.5 M $H_2SO_4$), and therefore are not relevant to the current application where only hydrated polymer (in the absence of acid electrolyte) is considered.

In yet another approach taught in PCT WO 00/79629 an ionomeric polymer is intimately mixed with a structural film-forming polymer, such as a terpolymer of tetrafluoroethylene, hexafluoropropylene and vinylidene fluoride (e.g., THV series available from Dyneon Corp., Oakdale, Minn.). It then is possible to form acceptably thin films using low equivalent weight ionomers. But, the degree of hydration is still relatively high, 80–110%, when 800 EW starting ionomer is used (e.g., Table 1 in WO 00/79629). Thus, these films might be expected to be relatively weak because of the high hydration.

Finally there is also a large body of art that describes approaches to forming non-ionomeric fluoropolymers. For the most part, this art is not relevant to the instant invention described here because the products produced do not have substantial ionic conductivity, i.e., the ionic conductivity of these products is less than about $1 \times 10^{-6}$ S/cm at room temperature.

Fluoropolymer ionically conducting membranes have been utilized in many different applications. One application that has been widely suggested is as electrolytic cell membranes for the electrolysis of sodium chloride as disclosed, for example, in U.S. Pat. Nos. 4,358,545, 4,417,969, and 4,478,695. Additionally, this generic class of polymers described as fluoropolymer ionomers have been proposed for use as coatings as described above in U.S. Pat. No. 4,661,411 to Martin et. al.; as wire insulation (e.g., in WO 90/15828); as replacements for acid catalysts, primarily in organic synthesis as described in "Perfluorinated Resin sulfonic Acid (Nafion-H(R)) Catalysis in Synthesis", by Olah, G. A., Iyer P. S. and Surya P. G. K., in Journal: Synthesis (Stuttgart), 1986 (7) 513–531, and in "Perfluorinated Resin sulfonic acid (Nafion-H) Catalysis in Organic Synthesis" by Yamato, T., in Yuki Gosei Kagaku Kyokaishi/Journal of Synthetic Organic Chemistry, volume 53, number 6, June 1995, p 487–499; as a membrane for water electrolysis as described in Yen, R. S., McBreen, J., Kissel, G., Kulesa, F. and Srinivasan, S. in the Journal of Applied Electrochemistry, volume 10, pg. 741, 1980; as a membrane for electrowinning as described, for example, in "The Use of Nation-415 Membrane in Copper Electrowinning from Chloride Solution" by Raudsepp, R., and Vreugde, M., in CIM Bulletin, 1982, V75, N842, P122; in metal ion recovery systems as described in product literature of Nafion® perfluorinated membrane case histories, DuPont Company, Polymer Products Department, Wilmington, Del. 19898; as a tube to continuously and very selectively dry wet gas streams (see product literature from Perma Pure, Inc., Toms River, N.J.); and as components in polymer electrolyte membrane (PEM) fuel cells. In the latter case, they can function both as the electrolyte or a component thereof, for example as described in by Bahar et. al. in U.S. Pat. Nos. 5,547,551 and 5,599,614; and/or as a component in one or both of the electrodes of the MEA.

When the ion conducting polymers, or ionomers, are used as the electrolyte in PEM fuel cells they conduct protons from one electrode to the other. A common problem associated with such fuel cells is that contaminants such as carbon monoxide tend to poison the catalysts used in the MEA. These contaminants can interfere with the flow of ions between the electrodes and thus degrade the performance of the fuel cell.

One way to reduce the effect of carbon monoxide is to operate the fuel cell at an elevated temperature. This reduces the formation and/or increases the destruction rate of potential contaminants and thereby allows more efficient electrode performance.

The problem with running at high temperatures, however, is that it vaporizes liquid water within the fuel cell, and in so doing, tends to reduce the degree of hydration in the membrane. As described above, decreasing the hydration lowers the ionic conductivity, thereby reducing the efficiency of ion transport through the membrane and adversely affecting fuel cell operation. In fact, at lower temperatures, in PEM fuel cells using conventional ionomers the incoming gas streams are usually well-humidified in order to maintain a relatively high degree of hydration. Only by adding the additional water in the form of humidity in the gases can the hydration be kept high enough to allow efficient fuel cell operation for long periods of time. However, as the temperature gets close to, or above, the boiling point of water this approach becomes difficult and inefficient. Thus, an ionomer with relatively low hydration and acceptably high ionic conductivity would require less ambient water to function as the electrolyte in PEM fuel cells. It could function efficiently both in lower humidity environments at lower temperatures, as well as at temperatures closer to and even potentially above the boiling point of water.

As described above, the known low equivalent weight ionomers have a relatively high hydration. They are also known to be partially or completely soluble in water as well. These factors would counsel against their use in environments where water is produced, e.g. hydrogen-oxygen fuel cells, because these polymers tend to become physically unstable in these environments. In addition, as described above and shown recently (WO 00/52060, Table 1) the ionic conductivity decreases as the equivalent weight goes down concomitant with a large increase in hydration. The ionic conductivity reported in WO '060 decreases by more than 30% when the equivalent weight of the subject ionomer is reduced from 834 to 785.

Against this background of conventional wisdom, applicants have discovered a low equivalent weight ionomer that has a combination of very high ionic conductivity while maintaining a relatively low hydration. As a result, this invention makes possible the more effective use of solid fluoropolymer membranes in existing applications such as those described above. Additionally, new applications heretofore not practical may become possible with this new, unique set of characteristics. The instant invention is particularly valuable as an electrolyte or component thereof, or as a component in the electrode of polymer electrolyte membrane fuel cells operating at high temperatures or low humidities.

SUMMARY OF THE INVENTION

The present invention is a fluorinated ionomeric co-polymer comprising
(a) a substantially fluorinated backbone;
(b) pendant groups derived from an ionomeric monomer of the formula

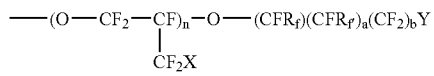

where X is F, Cl or Br or mixtures thereof; n is an integer equal to zero, one or two; $R_f$ and $R_{f'}$ are independently selected from the group of F, Cl, perfluoroalkyl radical, and chloroperfluoroalkyl radical; Y is an acid group or a functional group convertible to an acid group; a is zero or an integer greater than zero; and b is an integer greater than zero; and
(c) pendant groups derived from a vinyl ether monomer that has at least two vinyl ether groups of the form, $CA_2$=CB—O—, where the vinyl groups are separated by greater than four atoms; A is independently selected from the group containing F, Cl, and H; and B is independently selected from F, Cl, H and $OR_i$, where $R_i$ is a branched or straight chain alkane that may be partially, substantially or completely fluorinated or chlorinated;

wherein the concentration of the pendant groups derived from the ionomeric monomer and the vinyl ether monomer is between about 10 mole percent and about 45 mole percent of the final product, and wherein the concentration of the pendant groups derived from the vinyl ether monomer is present in the final product between about 0.05 and about 2 mole percent.

These ionomers are adapted to be processed into thin films that have acceptable physical stability. They are thus extremely well-suited for low humidity or high temperature fuel cell applications.

DETAILED DESCRIPTION OF THE INVENTION

Figure 1:
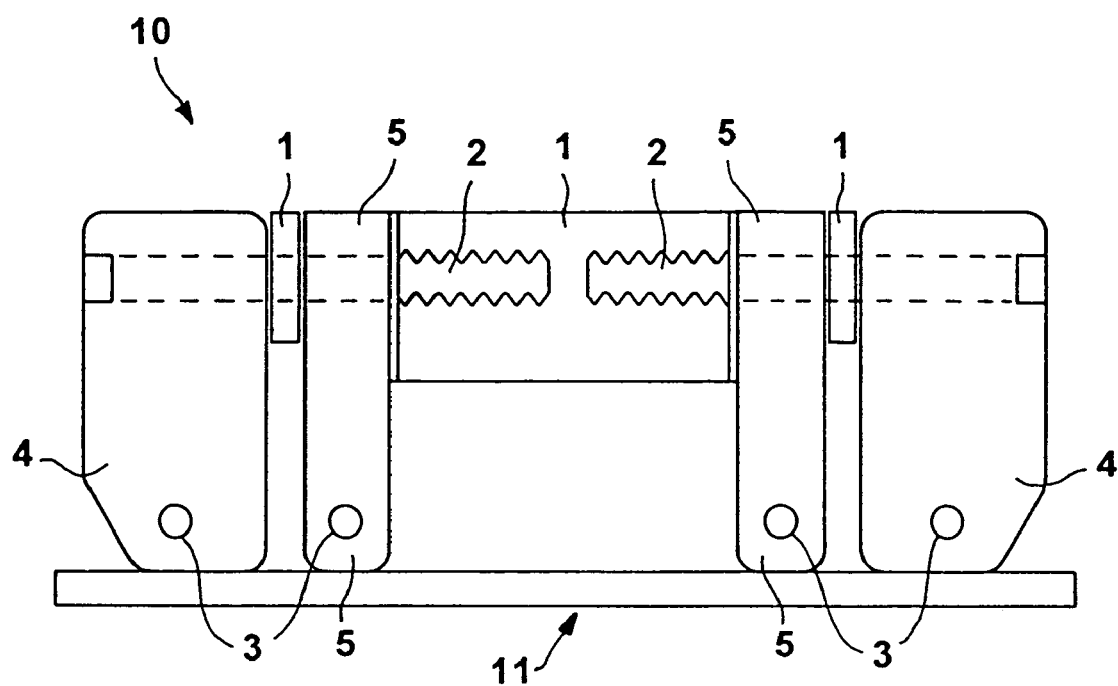
FIG. 1 is a schematic of a room temperature ionic conductivity fixture.

In this invention, the addition of low levels of branch forming agents during a mini-emulsion polymerization process is described for producing a co-polymer of two or more monomers. The co-polymer comprises a substantially fluorinated backbone and one or more ionomers, such that the product has unusually high ionic conductivity and relatively low hydration. The branch forming agents are added at a level below that required to produce an insoluble gel, yet have surprising and substantial effects on the final product.

The process used herein is generally known in the art as mini-emulsion polymerization, as described for example in Chapter 20, Miniemulsion Polymerization by E. David Sudol and Mohamed S. El-Aasser, in *Emulsion Polymerization and Emulsion Polymers*, P. A. Lowell and M. S. El-Aasser, eds, John Wiley and Sons, Ltd, New York, 1997. In these processes, a mini-emulsion, which is defined herein by a droplet size in an emulsion between 50 and 500 nm, is formed by subjecting an oil (herein an ionomer)/water/surfactant/co-surfactant system to high shear mixing such as that produced by an ultrasonifier, a Manton Gaulin homogenizer, or a microfluidizer. This mini-emulsion is then subjected to a polymerization reaction. The processes and products produced from these processes in the present invention are substantially different than prior art, e.g., that described in U.S. Pat. No. 5,608,022 to Nakayama et. al., and WO 00/52060 to Bekarian, et. al, because of the presence of the co-surfactant. The use of a co-surfactant to aid in achieving a mini-emulsion offers the advantage of using lower quantities of the surfactant, which can be advantageous because high concentrations of the surfactant may have detrimental effects on the final product.

Although the use of a co-surfactant in microemulsion polymerization of fluoropolymers has been recognized in the art (e.g., see Wu et. al. in U.S. Pat. No. 6,046,271) the use of the a mini-emulsion process with a co-surfactant for the preparation of ionomeric polymers described herein is novel. For example, in '271 Wu discloses a polymerization procedure of forming a microemulsion of at least one liquid perfluorinated hydrocarbon compound; adding at least one gaseous free-radical polymerizable polymer to the microemulsion; and initiating polymerization by adding a free radical initiator to the mixture. Wu did not anticipate the use of monomers with acid end groups described herein, specifically disclosing only straight chain fluoro or chlorofluoro alkenes or vinyl ethers (e.g., see column 4, lines 20–28) that will give products that are not ionomers. Further, the addition of branch forming agents as used herein was also not anticipated. The particularly surprising result we have discovered is that by using an ionomeric monomer in a mini-emulsion polymerization in the presence of a co-surfactant (instead of the micro-emulsion of straight chain alkenes disclosed previously) together with very low levels of a branch forming agent, we are able to produce polymers that have unusually high ionic conductivity. This totally unexpected result, coupled with equally surprising relatively low hydration of the resulting polymer, allow the production of ion conducting membranes of great value.

In a co-pending application to Wu et. al, entitled, "Low Equivalent Weight Ionomers", an aqueous miniemulsion polymerization procedure is described for producing a copolymer with two or more monomers comprising a substantially fluorinated backbone and one or more ionomers, such that the product has unusually high ionic conductivity. That application did not anticipate that it would be possible to use branch forming agents at low levels to even further improve the properties of the resulting polymer. The particularly surprising result we have discovered is that by adding a branch forming agent at a level below that required to product branch forming during polymerization of a co-polymer with a substantially fluorinated backbone and one or more ionomers, we are able to produce polymers that have exceptional properties. In particular, the polymers can be easily formed into films that have a combination of very high room temperature ionic conductivity, relatively low hydration, and acceptable physical stability. This totally unexpected result has produced membranes of great value.

In one embodiment of the instant invention, a perfluorinated hydrocarbon is used as a co-surfactant in a mini-emulsion polymerization process described more fully below. A branch forming agent is introduced into the polymerization reaction at low levels, which surprisingly gives rise to a set of very desirable properties in the resulting ionomer. The polymer particles so produced can easily be formed into thin films that have unusually high ionic conductivity, greater than about 0.15 S/cm at room temperature. Additionally, these films have relatively low hydration, and relatively high physical stability when compared to similar films prepared by prior art.

The co-surfactants can be chosen from among those co-surfactants known in the art, such as alcohols, amines or other amphiphilic molecules, or salts. Single or multiple co-surfactants can be employed to facilitate formation of the mini-emulsion. A particularly preferable co-surfactant is one drawn from the class of perfluorinated hydrocarbons of low molecular weight that is liquid at the temperature at which polymerization is carried out. The molecular weight is preferably less than 2000. The perfluorinated hydrocarbon preferably has a boiling point less than 300 degrees C. The perfluorinated hydrocarbon can be a perfluorinated saturated aliphatic compound such as a perfluorinated alkane. It can also be a perfluorinated aromatic compound such as perfluorinated benzene; a perfluorinated alkyl amine such as a perfluorinated trialkyl amine; a perfluorinated cyclic aliphatic, such as decalin or perfluoro tetradecahydrophenanthrene; or a heterocyclic aliphatic compound containing oxygen or sulfur in the ring, such as perfluoro-2-butyl tetrahydrofuran. Examples of perfluorinated hydrocarbons include perfluoro-2-butyltetrahydrofuran, perfluorodecalin, perfluoromethyldecalin, perfluorodimethyldecalin, perfluoromethylcyclohexane, perfluoro(1,3-dimethylcyclohexane), perfluorodimethyldecahydronaphthalene, perfluorofluoorene, perfluorotetracosane, perfluorokerosenes, octafluoronaphthalene, oligomers of poly(chlorotrifluoroethylene), perfluoro(trialkylamine) such as perfluoro(tripropylamine), perfluoro(tributylamine), or perfluoro(tripentylamine), and octafluorotoluene, hexafluorobenzene, perfluoro ethers or perfluorinated polyethers, and commercial fluorinated solvents, such as Fluorinert FC-77 or FC-75 produced by 3M. The fluorinated alkanes can be linear or branched, with a carbon atom number between 3 and 20. Oxygen, nitrogen or sulfur atoms can also be present in the molecules.

The fluorinated surfactant has the structure $R_g EX$, where $R_g$ is a fluorinated alkyl or a fluorinated polyether group with a carbon number between 4 and 16, E is an alkylene group with a carbon number between 0 and 4, and X is an anionic salt such as COOM, $SO_3M$, $SO_4M$, a cationic moiety such as quarternary ammonium salt, or an amphoteric moiety such as aminoxide, or a non-ionic moiety such as $(CH_2CH_2O)_m H$; and M is H, Li, Na, K, or $NH_4$; and m is a cardinal number of 2 to 40. One preferred fluorinated surfactant is ammonium perfluoro octanoate.

The substantially fluorinated backbone of this invention can be a polymer prepared from a number of different monomers or co-monomers that have a high fluorine concentration. These can include, but are not limited to tetrafluoroethylene, and mixtures of tetrafluorethylene with one or more monomers selected from the group hexafluoropropylene, vinyledene fluoride, chlorotrifluoroethylene, perfluoropropylvinyl ether, perfluoromethylvinyl ether and ethylene. One preferred monomer used to form the substantially fluorinated backbone is tetrafluoroethylene.

The ionomeric monomers used in the polymerization reaction are substantially fluorinated organic compounds containing at least one moiety that has ionic functionality and at least one polymerizable group. Alternatively, the molecule may carry precursors that can be converted into ionic functionality after the polymerization process is complete. Examples of monomers suitable for forming these ionomers include compounds having the formula

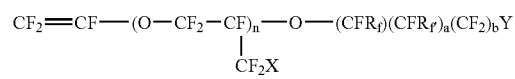

and the like which after polymerization form pendant groups on the substantially fluorinated backbone of the form

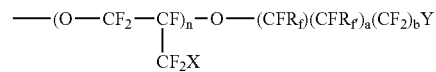

In the above, X is F, Cl or Br or mixtures thereof; n is an integer equal to one or two; $R_f$ and $R_{f'}$ are independently selected from the group of F, Cl, perfluoroalkyl radical, and chloroperfluoroalkyl radical; Y is an acid group or a functional group convertible to an acid group; a is zero or an integer greater than zero; and b is an integer greater than zero. Examples of Y that include acid groups include, but are not limited to, sulfonic acid or its salt form, —$SO_3Z$; sulfonamide, —$SO_2N(R_1)$—; sulfonimide, —$SO_2N(R_1)SO_2R_2$; carboxylic acid, —$CO_2Z$; phosphonic acid, —$PO_3H_2$; and the like, wherein Z is H, or any combination of cations including, but not limited to, ammonium ion, metallic ions; or organoammonium ions; $R_1$ is H, an alkyl group with carbon number from 1 to 10, or a partially fluorinated alkyl group with a carbon number of 2–10; and $R_2$ is a perfluorinated alkyl chain with carbon number from 1 to 8, which can optionally contain oxygen or other atoms or groups that are stable to free radicals; or a perfluoroalkyl group, which can also optionally contain oxygen or other atoms or groups that are stable to free radicals and is terminated with Y as it is defined above. Examples of Y that are function groups convertible to an acid group include, but are not limited to, sulfonyl halide, —$SO_2W$; ester, —COOR; and the like, wherein W is F, Cl, or Br, and R is an alkyl group with carbon number from 1 to 20. One preferred ionomeric monomer is $CF_2$=CF—O—$CF_2CF(CF_3)$—O—$CF_2CF_2$—$SO_2F$ that forms pendant groups having the formula, —O—$CF_2CF(CF_3)$—O—$CF_2CF_2$—$SO_2F$. For this particular ionomer with TFE as the comonomer, the conversion between equivalent weight and mole percent of ionomer is given approximately by Mole % ionomer=100/(n+1)

where n, the number of backbone units per ionomer unit, is given by n=(equivalent weight of polymer−446)/100

More generally for other functional monomers and other comonomers, n is given by $$n = \frac{(\text{equivalent weight of polymer}) - (\text{molecular weight of ionomeric monomer})}{(\text{molecular weight of comonomer})}$$

The branch forming agent that is added in low levels comprises a monomer selected from a group of vinyl ether compounds. In this application, low levels of such agents are defined as levels that do not cause substantial gellation or network formation of the resulting product. The branch forming agents include, but are not limited to, monomers that have at least two vinyl ether groups of the form, $CA_2=CB-O-$, such that the vinyl groups are separated by greater than four atoms. Here, A is independently selected from the group containing F, Cl, H; and B is independently selected from F, Cl, H and $OR_i$, where $R_i$ is a branched or straight chain alkane that may be partially, substantially or completely fluorinated or chlorinated. Particularly preferable branch forming agents in this class are perfluorinated vinyl ether compounds, $CF_2=CF-O-R_h-O-CF=CF_2$, wherein the $R_h$ group is a perfluorinated alkane with carbon number ranging from 3 to 15. The $R_h$ alkane carbons can optionally be branched and/or may be inserted with some ether linkages, such as $-CF_2-O-CF_2-$, or sulfur linkage, such as a sulfonimide, or other linkages that do not take part in polymerization. The perfluorinated vinyl ether compounds can be produced from hexafluoropropylene oxide and a perfluorinated di-acid fluoride by methods known in the art.

Without being bound by any particular theory, it is believed that the presence of the vinyl ether compound at low levels introduces long chain branching into the resulting polymer. By introducing it at low levels, the formation of cross-linking is minimized. High levels of cross-linking may be undesirable because it would be expected to product a polymer that will not easily be formed into the desirable membrane form of the polymer. At low levels, the concentration of the agent is not sufficient to obtain much, if any, cross linking. Instead, the agent acts to form long chain branching of the ionomeric co-monomer, which in turn gives rise to the surprising and unexpected improvement in conductivity and degree of hydration.

The preparation of the branch forming agents used herein are well known in the art, as disclosed for example in U.S. Pat. No. 3,291,843, which is included herein by reference in its entirety. Example XVIII in '843 illustrates one procedure for preparing one branch forming agent disclosed herein, i.e., $F_2C=CFO(CF_2)_5OCF=CF_2$. Another process for the formation of a different branch forming agent is to start with 2,2-difluoromalonic acid fluoride ($O=CF-CF_2-CF=O$) and hexafluoro propylene oxide. 2,2-difluoromalonic acid fluoride is prepared by direct fluorination of malonic acid by $F_2$ gas. The addition reaction of one molecule of 2,2-difluoromalonic acid fluoride and two molecules of hexafluoro propylene oxide will produce one molecule of

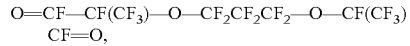
CF=O, which after a standard decarboxylation reaction (see for example, Example V in '843 or column 9, lines 24–38 in U.S. Pat. No. 5,463,005), becomes the desired branch forming monomer. If desirable, the product can be reacted to a more stable form for long-term storage, for example a brominated form where the vinyl groups are saturated with bromine, becoming for example in this case, $BrCF_2CFBrOCF_2CF_2CF_2OCFBrCF_2Br$. The vinyl form can then be regenerated prior to use with standard appoaches, for example by flowing the brominated form over zinc metal.

The amount of branch forming agent added during the polymerization of the inventive product is low by usual practices in the art, being added at levels so that the amount in the product is less than 5% by weight, and preferably less than 2.5% by weight. For example, when using the preferred perfluorinated vinyl ether compound, it is present in the fluorinated ionomer in an amount by weight of about 0.3% to about 5.0%, and preferably less than about 2.5%.

The preparation of the mini-emulsion depends on careful selection of the ingredients. The mini-emulsion is prepared by mixing water, perfluorinated hydrocarbon, fluorinated surfactant(s), ionomer, co-surfactant or inorganic salts, and the vinyl ether compound. The amounts employed are 0.1–40 weight percent, preferably 0.1–20, of the perfluorinated hydrocarbon; 1–40 weight percent, preferably 0.1–25, of the surfactant and cosurfactants; 1–20 weight percent, preferably 5–15, of the ionomer; 0.3–5 weight percent, preferably less than 2.5 weight percent, with the remainder water. This mixture is subjected to high shear mixing using methods known in the art such as mechanical shear and/or cavitation to break the oil phase into submicron size droplets. Multiple passes through such mixers may be required to obtain a mini-emulsion. The resulting mini-emulsion is neither completely transparent as observed with microemulsions, nor milky white as it is in a (macro)emulsion. Rather, it is substantially translucent, often with a slight hint of color, for example a blue tint. Without being bound by any particular theory, the resulting mini-emulsion of perfluorinated hydrocarbons is believed to serve as mini-reactors for fluorinated monomers to enter and to be polymerized.

To initiate polymerization, the temperature of the mini-emulsion is adjusted to between 0 and 150 degrees C., preferably 40 to 100 degrees C. Initiators for polymerization include free-radical initiators, such as persulfates, azo initiators, peroxides, or photo initiators, which can generate free radicals by ultraviolet or gamma rays. Amount of initiators present can range between 0.001 to 5 percent by weight based on the final polymer content. The fluorinated monomers are introduced to the reactor either in vapor phase or liquid phase into the aqueous liquid. Sufficient mixing between phases is important to encourage mass transfer.

As will be understood by one well practiced in the art, other polymerization procedures may also be employed. In particular, the use of the perfluorinated hydrocarbon of low molecular weight as part of the polymerization mixture is not necessarily required, as long as the low levels of branch forming agent are still employed. In particular, the general polymerization process described in U.S. Pat. No. 3,282,875, U.S. Pat. No. 4,358,545, and that in WO/00/52060 to Bekarian, et. al. may be employed as long as the low levels of branch forming agent are employed appropriately during polymerization.

Figure 4:
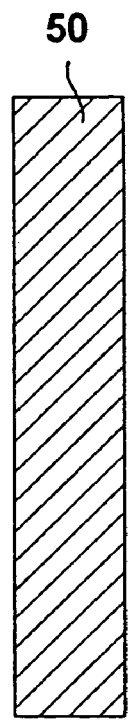
FIG. 4 is a cross-sectional view of a membrane formed from an ionomer according to an exemplary embodiment of the present invention.
Figure 5:
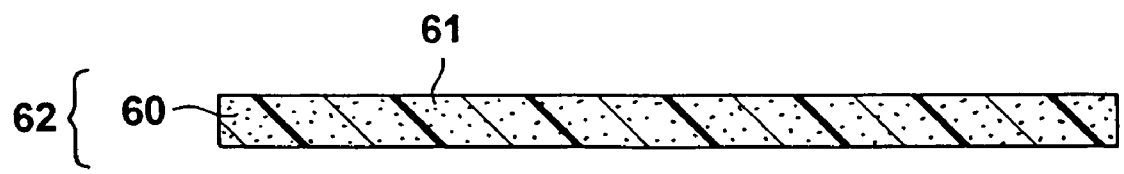
FIG. 5 is a cross-sectional view of a composite membrane formed using an ionomer according to an exemplary embodiment of the present invention.

The product produced from the polymerization is an ion conducting polymer with low equivalent weight and relatively low hydration. The resultant ionomers are nonetheless soluble in organic solvents, which allows them to be formed into thin films, either alone (see film 50 in the exemplary embodiment shown in FIG. 4) or in composites with other substrates to form a composite membrane (see substrate 60 and ionomer 61 forming composite membrane 62 in the exemplary embodiment shown in FIG. 5). Such other substrates may comprise a support of porous material such as expanded polytetrafluoroethylene (ePTFE). As used herein, "porous" means having a plurality of interconnected passages and pathways. Solutions of the ionomer may be impregnated into the porous support by methods known in the art, for example as described in U.S. Pat. Nos. 5,547,551 and 5,599,614 to Bahar et. al.

Figure 6:
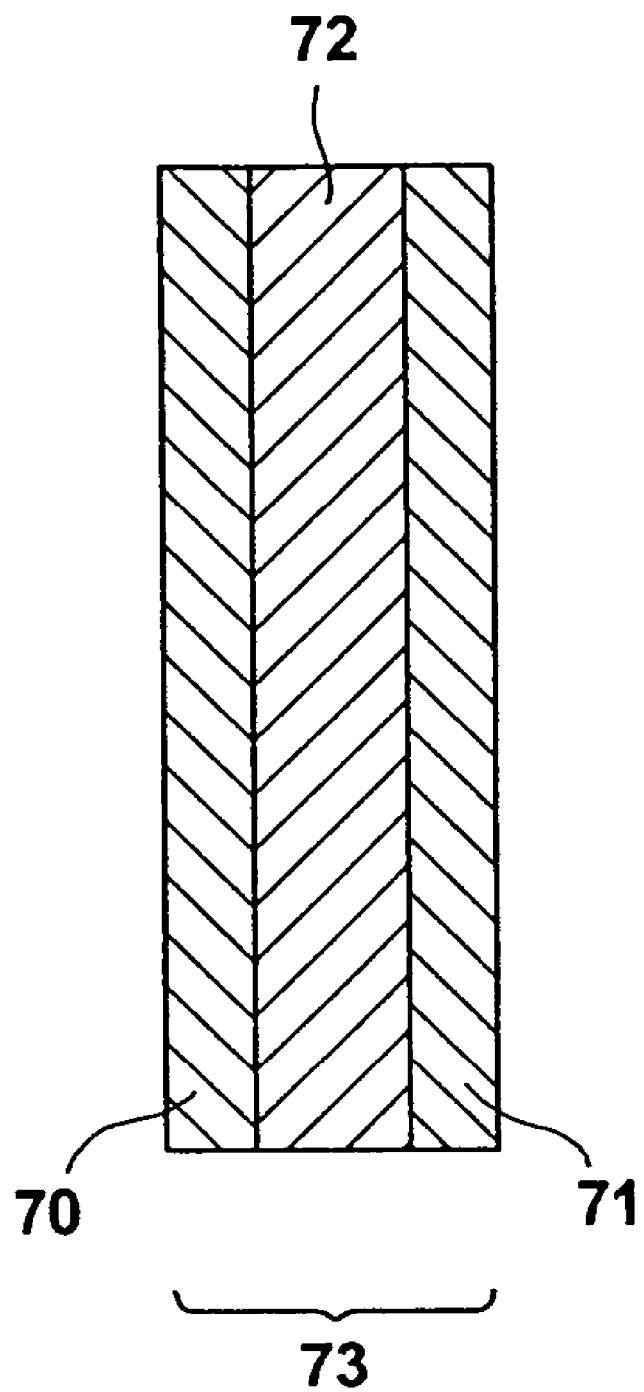
FIG. 6 is a cross-sectional view of a membrane electrode assembly formed using an ionomer according to an exemplary embodiment of the present invention.
Figure 7:
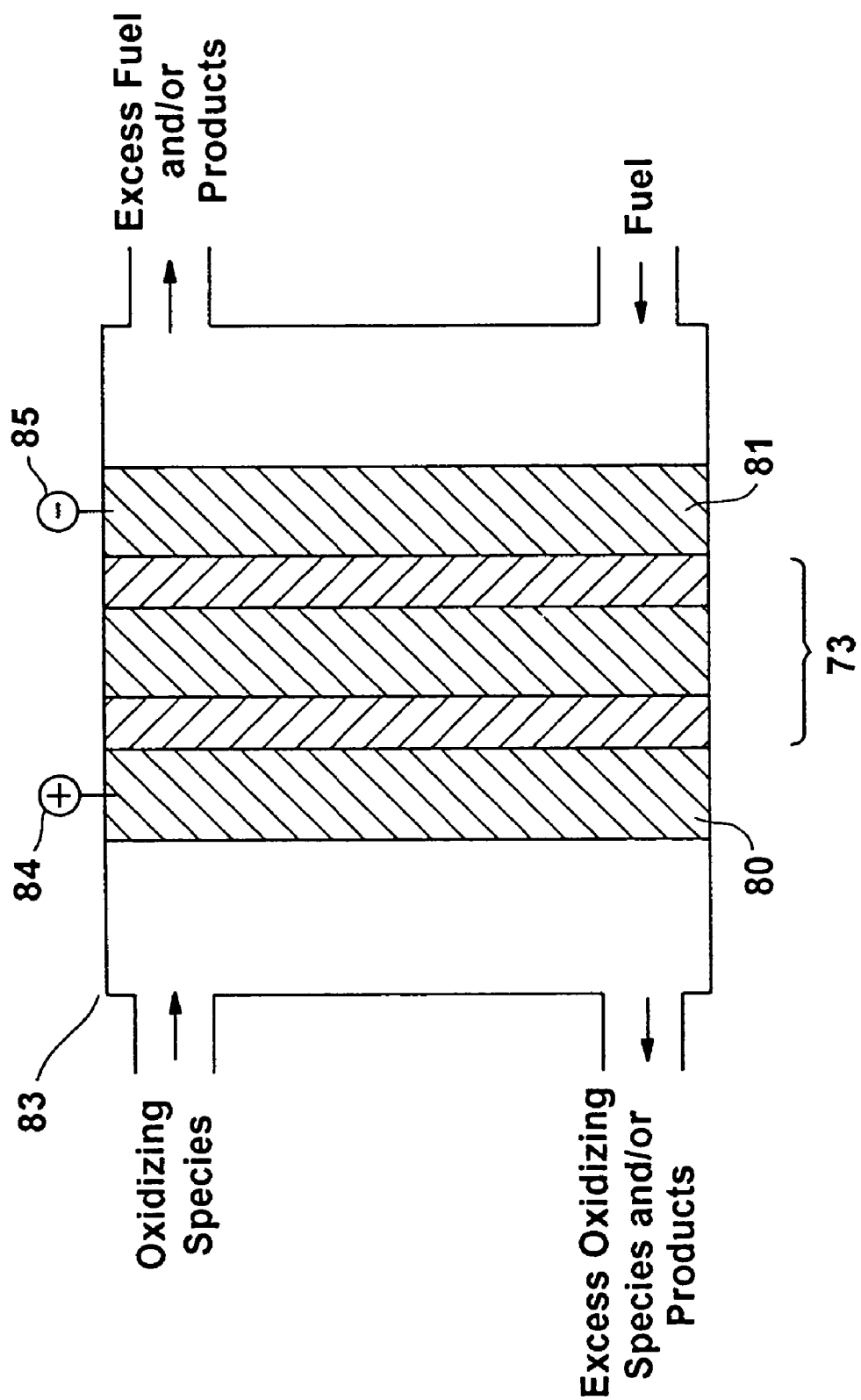
FIG. 7 is a cross-sectional view of a fuel cell including an ionomer according to an exemplary embodiment of the present invention.

Such films are useful as separator membranes in membrane electrode assemblies (MEAs). As shown in the exemplary embodiment shown in FIG. 6, electrodes 70, 71 are adhered or otherwise attached to either side of a membrane 72 to form MEA 73. MEA 73 is in turn useful in a fuel cell 83, as shown in the exemplary embodiment shown in FIG. 7. Gas diffusion media 80 and 81 may optionally be attached or otherwise adhered to the electrodes, and current collectors (not shown) may optionally be connected to positive terminal 84 and negative terminal 85. During operation the fuel enters the cell and reacts at the anode to generate electrons that are collected at negative terminal 85. The electrons flow through an external load (not shown) to the cathode terminal 84. The electrons are used at the cathode together with the oxidizing species. Depending on the type of fuel and the type of oxidizing species, products may be formed in the anode compartment, the cathode compartment or both. If present, these products are swept out of the cell with any excess fuel and/or oxidizing species that may optionally have been used in the inlet gases. In another alternative embodiment, the electrodes in the MEA may also contain the instant invention as one component of a multi-component electrode system. The inventive polymer is also useful in other electrolytic cells.

The following procedures were used to characterize the ionomers prepared according the above description.

Membrane Formation

For examples below where membranes were required, and prior to the equivalent weight determination described below, the following procedure was followed. The acid form of the polymer was obtained from the sulfonyl fluoride form of the polymer using practices well known in the art. Here, it was generated by completely hydrolyzing the sulfonyl fluoride form of the polymer in KOH and then completely reacidifying in $HNO_3$. Approximately 2 g of solid ionomer pieces in the acid form weighing ~0.05 g each were placed in a uniform pile between two sheets of Kapton® polyimide film (DuPont High Performance Materials, Circleville, Ohio). The sandwich of material was placed between the preheated fully open 64 in$^2$ platens of a Marsh Instruments PHI pneumatic press. The platen temperature was set such that the temperature reading between the top and bottom platens when in contact with each other was 165° C. The bottom platen was then raised until the upper sheet of Kapton film made contact with the top platen. The ionomer sample was then allowed to sit for 15 minutes. The sandwich was then compressed by cycling the pressure 3–5 times between approximately 1 ton for 10 seconds and approximately zero tons for ten seconds. The pressure was then increased to 5 tons, then slowly increased to 10 tons over a period of 90 to 120 seconds. Finally, the pressure was then increased to 20 tons and the sample was held under 20 tons at 165° C. for 120 seconds to produce a uniform, clear film, typically approximately 5 mil thick.

Degree of Hydration

A sample ~1 cm by ~1.5 cm in size was cut from a membrane and placed in a vacuum oven at 120 degrees C. for ~70 hours at ~3 inches of Hg using a nitrogen bleed to maintain the pressure. The sample was removed, and weighed when cool (~1 minute or less) to obtain the dry weight. The sample was then placed in deionized water for 2 hours at room temperature. As used herein, room temperature is 23 degrees C. plus or minus two degrees. The sample was removed from water, patted dry with a paper cloth, and immediately weighed to obtain the hydrated weight. The degree of hydration in percent is calculated as $$\text{Degree of Hydration (in \%)} = \frac{100 * [\text{Hydrated Weight} - \text{Dry Weight}]}{\text{Dry Weight}}$$

Four samples for each membrane were tested, and the reported hydration is the arithmetic mean of the four measurements.

Equivalent Weight

The method used here to determine equivalent weight takes a measured weight of dried ionomer solid and calculates an acid equivalent weight based on the first inflection point of the titration curve near pH 7. Specifically for each sample, approximately 5 g of solid ionomer pieces weighing no more than 0.05 g each were dried in oven for at least two hours at 80° C. under full vacuum (~2 in. Hg). The dried pieces were removed from the oven and placed in a capped container in order to minimize moisture pickup. After allowing the dried sample to cool to room temperature in the capped container, approximately 0.15 g was quickly weighed into a 100 ml titration cup. The sample of known dry weight was then allowed to soak in the titration cup for 15 minutes in 5 ml of deionized water and 5 ml of ethanol. To the soaked sample, 55 ml of 2.0N NaCl solution were then added. A back titration method using a TIM900 Titration Manager (Radiometer Analytical S. A., Lyon, France) was then started beginning with the addition of 5 ml of 0.05N NaOH solution. The entire blend was then stirred for 15 minutes under a nitrogen blanket prior to the acid titration with 0.01N HCl solution. The end point near pH 7 was used to calculate both the ion exchange capacity (IEC) and the acid equivalent weight (EW) of the sample according to $$IEC \text{ (meq/g)} = \frac{[5 \text{ ml NaOH} \times 0.05 \text{ N}] - [\text{Volume HCl (ml)} \times 0.01 \text{ N}]}{\text{Dried Ionomer Solid Weight (g)}}$$

$$EW(g/eq) = 1000/IEC(meq/g)$$

The arithmetic mean of the measured results from two different samples of each membrane is reported as the Equivalent Weight.

Room Temperature Ionic Conductivity

A membrane sample about 1.5 inches by about 2 inches in size was first equilibrated at room conditions of 21 degrees C., 61% RH for 24 hrs. It was then immersed into a plastic beaker containing room temperature deionized water. Three measurements were taken over 90 minutes, one every 30 minutes. To take the measurements the membrane sample was taken out of the water and patted dry by paper tissues. The thickness was then measured immediately using an MT12B Heidenhain (Schaunburg, Ill.) thickness gauge attached to a Heidenhain ND281B digital display. The gauge was mounted vertically over a flat plate, and measurements were made at nine different locations on the sample, covering the corners and center of the sample. The spring-loaded probe of the gauge was lowered gently on the film for each measurement to minimize compression. The mean of the nine values was used as the sample thickness. The ionic resistance of the membrane, 11, was then measured using a four-point probe conductivity cell shown in FIG. 1. The sensing probes, 5, of conductivity cell, 10, are approximately one inch long, and approximately one inch apart. A Plexiglas spacer 1 provides insulation between the current probes 4 and sensing probes 5. The cell is held together with nylon screws 2 and electrical contact is made to the probes through holes 3. During the measurement, a 500 g weight (not shown) was loaded onto the cell to ensure good contact. It was found that the resistance value is independent of further pressure onto conductivity cell 10. The resistance was measured by connecting leads (not shown) through holes 3 using 10 mV AC amplitude at 1000 Hz frequency applied by a Solartron SI 1280B controlled by ZPlot software written by Scribner Associates. Measurements were taken in the potentiostatic mode. Under these conditions, the phase angle was found to be insignificant throughout the measurement. The room temperature ionic conductivity in S/cm for each measurement was calculated from the formula $$\sigma = \frac{L_2}{R * L_1 * D}$$

Where σ is the room temperature ionic conductivity, L2 is distance between the sensing probes, here equal to 2.5654 cm, L1 is the length of the sensing probe, here 2.5603 cm, D is the measured thickness of the membrane in cm, and R is the measured resistance in ohms. The results showed that the room temperature ionic conductivity was independent of the soaking time between 30 and 90 minutes for all the samples tested. The reported value is the average calculated from the three measurements.

High Temperature Ionic Conductivity

The high temperature ionic conductivity at temperatures of 80 and 120 degrees C. was also measured. In this case, the conductivity was measured using a different apparatus where the temperature and relative humidity of the atmosphere could be more precisely controlled. These measurements were performed to confirm that the conductivity of samples soaked in room temperature water and measured at room temperature showed the same trends between materials as samples measured at higher temperature and equilibrated at a fixed relative humidity condition. These measurements are particularly relevant because it is well known that Schröder's paradox [P. Schröder, Z. Physik Chem., Vol. 75, pg. 75 (1903)] is observed in perfluorosulfonic acid type ionomeric membranes [e.g., see T. A. Zawodzinski, T. E. Springer, F. Uribe and S. Gottesfeld, Solid State Ionics, Vol. 60, pg. 199 (1993) and G. Blumenthal, M. Cappadonia and M. Lehmann, Ionics, Vol. 2, pg. 102 (1996)]. It is thus expected that the measured conductivity of the inventive membrane will be different when measured in liquid water compared to that measured in 100% relative humidity at the same temperature even though the water activity is, in theory, equal to one in both cases. Therefore, to confirm that the inventive ionomers do indeed have improved conductivity when in equilibrium with water vapor as well as when soaked in liquid water, a high temperature conductivity test was performed where the relative humidity and temperature were controlled.

Figure 2:
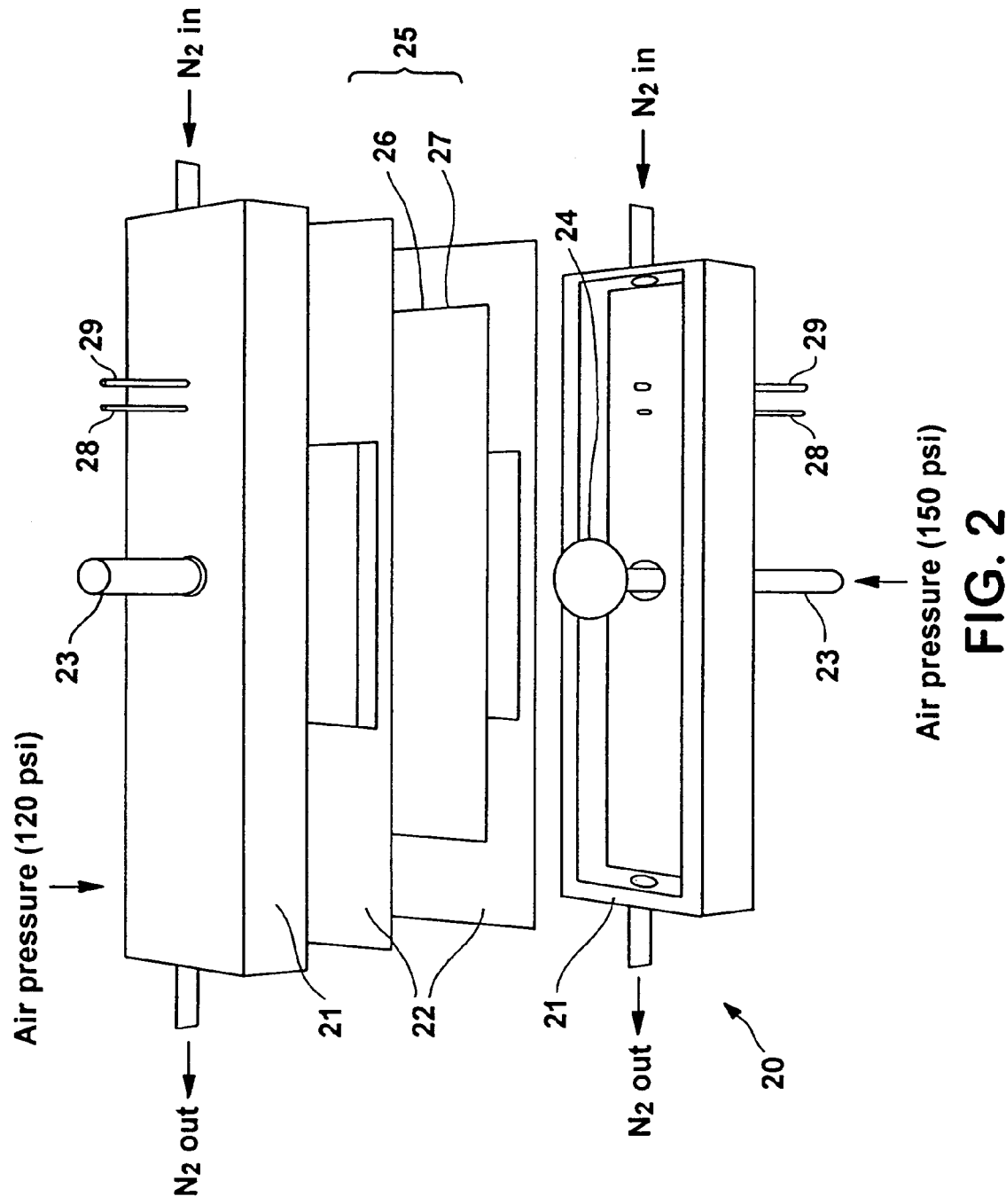
FIG. 2 is a schematic of a high temperature conductivity cell.

This test was performed as follows: three different thicknesses of the sample membrane to be tested were prepared as described above. Two 0.5 inch diameter ELAT® gas diffusion media (GDM) available from E-TEK, Inc. were die cut. Approximately 1 mg/cm² of ionomer prepared according to Example 2 in co-pending application to Wu et. al., was brushed onto the GDM surface, and then placed against an ~1.5 inch by ~1.5 inch sample membrane to form a sandwich. This sandwich was then laminated for 3 minutes by applying 15 tons of pressure to ~18 inch by ~18 inch platens of a hydraulic press where the top platen was heated to 160 degrees C. After cooling, the GDM/sample/GDM sandwich was placed in the high temperature ionic conductivity apparatus 20 as shown in FIG. 2 for testing.

The apparatus 20 consists of a split aluminum body 21 with a polytetrafluoroethylene (PTFE) cell 22. Cell 22 is clamped together during operation with an air-actuated pressure of 120 psi. Two electrode leads 23 with 40% porous 316L stainless steel Pt coated pellets 24 welded on the end of the electrode leads 23 enter the cell 22 through the center to form the two electrodes between which the test sample 25 is placed. Test sample 25 comprises sample membrane 26 with GDM 27 on both sides prepared as described above. The bottom electrode lead 23 is attached to an air actuated cylinder (not shown) that can apply a fixed pressure to the bottom electrode lead. A pressure of 150 psi was used for all testing described herein. Nitrogen gas is flowed into the cell through two lines, one for each half of the cell. The humidity of the each inlet gas stream is controlled by flowing the gas through a bottle of water where the temperature is fixed. The gas lines after the each humidification bottle are also heated to prevent condensation. The cell temperature, temperature of the humidification bottles, and gas lines are controlled by a Scribner Associates Membrane Test System (Scribner Associates, North Carolina). The humidity of both inlet gas streams is measured with a Vaisala HM138 humidity probe (Vaisala Group, Vantaa, Finland). For all testing here, the measured humidity of both halves of the cell was the same to within 3–5 percent RH.

After placing the test sample 25 in the cell, closing it, and applying pressure to the cell and the electrode leads, the cell was heated to the lowest test temperature with flowing dry gas. It was equilibrated under dry gas at that temperature for 30 minutes. Then the humidity was stepped to 10% RH. The frequency for measurements was then determined by measuring the impedance in potentiostatic mode with a frequency sweep from ~1 Hz to ~20 kHz using a Solartron 1280B Impedance Analyzer (Solartron Analytical, Hampshire, England). The frequency where the measured phase angle was about zero was determined. This frequency was used in all subsequent measurements. Typically, this frequency was in the range of 7 to 15 kHz. The test sequence was then initiated under computer control whereby the humidity was changed at low temperatures to the following values: about 10, 20, 40, 50, 60, 80, and 90 percent RH. Impedance measurements at each RH step were recorded at five second intervals until the impedance changed less than 1 milliohm. This steady state impedance (equal to the resistance since the phase angle is zero) was recorded as the cell resistance at that temperature and RH. Then the cell is stepped to a new higher temperature, returned to 10% RH, and the process repeated. For higher temperatures, it was not possible to reach high relative humidities because the cell was not operated under pressure. Therefore, the maximum RH achievable was lower at higher temperatures. In this case, six steps of RH were made between 10% and the maximum achievable RH at that temperature. The RH and temperature are reported here as the average of the two values obtained from the RH and thermocouple probes in each half of the cell.

In order to remove the effects of interfacial resistances, which can be a significant fraction of the total resistance, the resistance at any given temperature/RH condition was measured for samples of three different thicknesses. These resistances were plotted as a function of thickness, a linear regression fit to the data, and the extrapolated zero thickness resistance value was used as the interfacial resistance for that sample. This value was then subtracted from the measured resistance to obtain the actual sample resistance. The high temperature ionic conductivity was calculated from the formula:

$$\sigma = \frac{L}{R*A}$$

where L is the thickness of the sample measured before it is placed in the apparatus, and A is the area of the sample in contact with the electrode leads, i.e., π times the diameter squared divided by 4; and R is the measured resistance reduced by the interfacial resistance determined from the zero thickness extrapolation.

The following examples are intended to demonstrate but not to limit the inventive compounds and methods of making them.

EXAMPLE 1

A divinyl ether compound was formed by reacting 2,2-difluoromalonic acid fluoride (O=CF—$CF_2$—CF=O) and hexafluoro propylene oxide. The 2,2-difluoromalonic acid fluoride was prepared by direct fluorination of malonic acid by $F_2$ gas. The addition reaction of one molecule of 2,2-difluoromalonic acid fluoride and two molecules of hexafluoro propylene oxide produced one molecule of

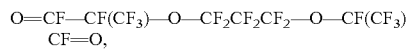
CF=O, which after a standard decarboxylation reaction became the desired branch forming monomer, $CF_2$=CF—O—$CF_2CF_2CF_2$—O—CF=$CF_2$. The product was reacted to a more stable form for long-term storage by flowing bromine gas through the product to saturate the vinyl groups with bromine, forming $CF_2BrCFBrOCF_2CF_2CF_2OCFBrCF_2Br$. The vinyl form was regenerated several days prior to use according to the following procedure: 120 grams of zinc powder and 200 ml of tetraglyme were charged into a 1 L flask equipped with a stirrer, thermometer, reflux condenser and dropping funnel. After heating to 100 degrees C., 200 ml of the brominated version of branching agent was added dropwise over about 2 hours by way of the dropping funnel to the stirring solution in the flask. The product was distilled under a reduced pressure of 150 ml Hg at 49 degrees C. Two hundred and five (205) grams of the vinyl ether branching agent, $CF_2$=CF—O—$CF_2CF_2CF_2$—O—CF=$CF_2$, was obtained for a yield of about 90%.

An aqueous mini-emulsion was prepared by pre-mixing and homogenization of a mixture containing 1650 grams of deionized water, and 50 grams of 20% by weight of ammonium perfluoro octanoate (ammonium salt of perfluoro octanoic acid, manufactured by 3M) aqueous solution, and 194 grams of 82.5% by weight of sulfonyl fluoride monomer having the formula $CF_2$=CF—O—$CF_2CF(CF_3)$—O—$CF_2CF_2$—$SO_2F$, and 17.5% by weight of Fluorinert® FC-77 (a perfluorinated hydrocarbon manufactured by 3M), and 1 gram of $CF_2$=CF—O—$CF_2CF_2CF_2$—O—CF=$CF_2$, the vinyl ether compound described above. A mini-emulsion was formed using the homogenizing module of a microfluidizer. An air motor using compressed air of about 40 psi sent the mixture through the homogenizing module. The whole mixture was sent through the homogenizing module six times. The final mixture was a translucent aqueous mini-emulsion of very light blue color. In a 4-liter pressure reactor, the aqueous mini-emulsion was added to the reactor. Then, the reactor was evacuated three times and purged each time with tetrafluoroethylene gas. The oxygen content of the aqueous solution was about 20 ppm immediately prior to admitting the tetrafluoroethylene gas.

The reactor agitation speed was set at 700 rpm throughout the reaction. The aqueous mini-emulsion was heated from the jacket to a temperature of about 70 degrees C. Then, tetrafluoroethylene gas was introduced to the pressure reactor and the pressure was raised to about 0.5 MPa. About 0.1 gram of ammonium persulfate pre-dissolved in 400 ml of deionized water was pumped into the reactor to start the reaction. The reaction temperature was maintained between 69 and 71 degrees C. The tetrafluoroethylene pressure was maintained relatively constant between 0.48 and 0.55 MPa for the first 2 hours of polymerization reaction, with continuous charge of tetrafluoroethylene gas to the reactor to compensate for the consumption of tetrafluoroethylene for copolymerization. After the 2 hours of polymerization reaction, the tetrafluoroethylene supply was stopped, and the reaction continued without more charge of tetrafluoroethylene to the reactor. The reaction pressure went down gradually from 0.48 MPa to 0.20 MPa in about 90 minutes. Then, the reaction temperature was lowered to below 50 degrees C. and the reaction system was evacuated to atmosphere. The reaction yielded an aqueous dispersion of about 2.29 kg. The total polymer obtained by precipitation and isolation was about 5.4% by weight of the dispersion product. The final polymer was calculated to contain about 0.8% by weight (0.47 mole %) of the divinyl ether compound, assuming complete incorporation of the divinyl monomer into the polymer. The Equivalent Weight of this sample was about 690. The concentration of pendant groups derived from the ionomeric monomer and the vinyl ether monomer is about 20%.

EXAMPLE 2

An aqueous mini-emulsion was prepared by pre-mixing and homogenization of a mixture containing 1650 grams of deionized water, and 50 grams of 20% by weight of ammonium perfluoro octanoate (ammonium salt of perfluoro octanoic acid) aqueous solution, and 186 grams of 85% by weight of $CF_2$=CF—O—$CF_2CF(CF_3)$—O—$CF_2CF_2$—$SO_2F$ monomer and 15% by weight of Fluorinert® FC-77 (a perfluorinated hydrocarbon manufactured by 3M), and 1 gram of $CF_2$=CF—O—$CF_2CF_2CF_2$—O—CF=$CF_2$, prepared as described in Example 1. In a 4-liter pressure reactor, the aqueous mini-emulsion was added to the reactor. Then, the reactor was evacuated three times and purged each time with tetrafluoroethylene gas. The oxygen content of the aqueous solution was about 20 ppm immediately prior to admitting the tetrafluoroethylene gas.

The reactor agitation speed was set at 700 rpm throughout the reaction. The aqueous mini-emulsion was heated from the jacket to a temperature about 60 degree C. Then, tetrafluoroethylene gas was introduced to the pressure reactor and the pressure was raised to about 0.5 MPa. About 0.1 gram of ammonium persulfate pre-dissolved in 400 ml of deionized water was pumped into the reactor to start the reaction. After 30 minutes, the reaction temperature was increased and maintained between 65 and 66 degrees C. The tetrafluoroethylene pressure was maintained at a relatively constant pressure between 0.52 and 0.56 MPa for the next 90 minutes of reaction, with continuous charge of tetrafluoroethylene gas to the reactor to compensate the consumption of tetrafluoroethylene for copolymerization. Then, the reaction temperature was increased again and maintained between 69 and 71 degree C. The tetrafluoroethylene pressure was maintained relatively constant between 0.49 and 0.57 MPa for the next 150 minutes of reaction, with continuous charge of tetrafluoroethylene gas to the reactor to compensate for the consumption of tetrafluoroethylene for copolymerization. Finally, the tetrafluoroethylene supply was stopped and the reaction continued at a temperature of about 70 degrees C. without more charge of tetrafluoroethylene to the reactor. The reaction pressure went down gradually from 0.48 MPa to 0.45 MPa in about 20 minutes. Then, the reaction temperature was lowered to below 50 degrees C. and the reaction system was evacuated to atmosphere. The reaction yielded an aqueous dispersion of about 2.32 kg. The total polymer obtained by precipitation and isolation was about 5.4% by weight of the dispersion product. The final polymer was calculated to contain about 0.8% by weight (0.47 mole %) of the divinyl ether compound, assuming complete incorporation of the divinyl monomer into the polymer. The Equivalent Weight of this sample was about 690. The concentration of pendant groups derived from the ionomeric monomer and the vinyl ether monomer is about 20%.

EXAMPLE 3

An aqueous mini-emulsion was prepared by pre-mixing and homogenization of a mixture containing 1650 grams of deionized water, and 50 grams of 20% by weight of ammonium perfluoro octanoate (ammonium salt of perfluoro octanoic acid) aqueous solution, and 160 grams of $CF_2=CF-O-CF_2CF(CF_3)-O-CF_2CF_2-SO_2F$ monomer and 40 grams of Fluorinert® FC-77 (a perfluorinated hydrocarbon manufactured by 3M), and 1 gram of $CF_2=CF-O-CF_2CF_2CF_2-O-CF=CF_2$, prepared as described in Example 1. In a 4-liter pressure reactor, the aqueous mini-emulsion was added to the reactor. Then, the reactor was evacuated three times and purged each time with tetrafluoroethylene gas. The oxygen content of the aqueous solution was about 20 ppm right immediately prior to admitting the tetrafluoroethylene gas.

The reactor agitation speed was set at 700 rpm throughout the reaction. The aqueous mini-emulsion was heated from the jacket to a temperature about 70 degrees C. Then, tetrafluoroethylene gas was introduced to the pressure reactor and the pressure was raised to about 0.5 MPa. About 0.1 gram of ammonium persulfate pre-dissolved in 400 ml of deionized water was pumped into the reactor to start the reaction. The reaction temperature was maintained between 69 and 71 degrees C. The tetrafluoroethylene pressure was maintained relatively constant between 0.48 and 0.51 MPa for the first 3 hours of reaction, with continuous charge of tetrafluoroethylene gas to the reactor to compensate for the consumption of tetrafluoroethylene for copolymerization. After the 3 hours of polymerization reaction, the tetrafluoroethylene supply was stopped and the reaction continued without more charge of tetrafluoroethylene to the reactor. The reaction pressure went down gradually from 0.48 MPa to 0.20 MPa in about 3 hours. Then, the reaction temperature was lowered to below 50 degrees C. and the reaction system was evacuated to atmosphere. The reaction yielded an aqueous dispersion of about 2.31 kg. The total polymer obtained by precipitation and isolation was about 8.0% by weight of the dispersion product. The final polymer was calculated to contain about 0.5% by weight (0.30 mole %) of the divinyl ether compound, assuming complete incorporation of the divinyl monomer into the polymer. The Equivalent Weight of this sample was about 690. The concentration of pendant groups derived from the ionomeric monomer and the vinyl ether monomer is about 20%.

EXAMPLE 4

An aqueous mini-emulsion was prepared by pre-mixing and homogenization of a mixture containing 1650 grams of deionized water, and 50 grams of 20% by weight of ammonium perfluoro octanoate (ammonium salt of perfluoro octanoic acid) aqueous solution, and 160 grams of $CF_2=CF-O-CF_2CF(CF_3)-O-CF_2CF_2-SO_2F$ monomer and 40 grams of Fluorinert® FC-77 (a perfluorinated hydrocarbon, manufactured by 3M), and 2.5 grams of $CF_2=CF-O-CF_2CF_2CF_2-O-CF=CF_2$, prepared as described in Example 1. In a 4-liter pressure reactor, the aqueous mini-emulsion was added to the reactor. Then, the reactor was evacuated three times and purged each time with tetrafluoroethylene gas. The oxygen content of the aqueous solution was about 13 ppm immediately prior to admitting the tetrafluoroethylene gas.

The reactor agitation speed was set at 700 rpm throughout the reaction. The aqueous mini-emulsion was heated from its jacket to a temperature about 70 degrees C. Then, tetrafluoroethylene gas was introduced to the pressure reactor and the pressure was raised to about 0.5 MPa. About 0.1 gram of ammonium persulfate pre-dissolved in 400 ml of deionized water was pumped into the reactor to start the reaction. The reaction temperature was maintained between 69 and 71 degrees C. The tetrafluoroethylene pressure was maintained at a relatively constant pressure between 0.45 and 0.51 MPa for the first 3 hours of reaction, with continuous charge of tetrafluoroethylene gas to the reactor to compensate for the consumption of tetrafluoroethylene for copolymerization. After the 3 hours of polymerization reaction, the tetrafluoroethylene supply was stopped, and the reaction continued without more charge of tetrafluoroethylene to the reactor. The reaction pressure went down gradually from 0.47 MPa to 0.31 MPa in about 1 hour. Then, the reaction temperature was lowered to below 50 degrees C. and the reaction system was evacuated to atmosphere. The reaction yielded an aqueous dispersion of about 2.30 kg. The total polymer obtained by precipitation and isolation was about 5.0% by weight of the dispersion product. The final polymer was calculated to contain about 2.2% by weight (1.29 mole %) of the divinyl ether compound, assuming complete incorporation of the divinyl monomer into the polymer. The Equivalent Weight of this sample was about 710. The concentration of pendant groups derived from the ionomeric monomer and the vinyl ether monomer is about 19%.

EXAMPLE 5

A membrane was formed from the fluorinated ionomeric co-polymer product of Example 2 using the film formation procedure described above. The equivalent weight, degree of hydration and room temperature conductivity of this film was measured according to the procedures described above. The results are presented in Table 1.

EXAMPLE 6

A membrane was formed from the fluorinated ionomeric co-polymer product of Example 2 using the film formation procedure described above except that the films were pressed using a temperature of 120 degrees C. instead of 165 degrees C. The equivalent weight, degree of hydration and ionic conductivity of this film was measured according to the procedures described above. The results are presented in Table 1. Comparing the results of Example 5 and 6 show that the film formation method does not substantially effect the properties of the resultant membrane.

COMPARATIVE EXAMPLE A

A Nafion® 112 membrane was purchased from Du Pont Co. It was tested as received to determine the equivalent weight and hydration. The conductivity was tested as described above except two measurements at 30 and 60 minutes were made in the machine direction on one piece of film, and a third measurement at 90 minutes was made in the transverse direction of a second piece of film. No significant different was observed between the conductivity of the two directions as expected from prior literature [see, for example, G. Blumenthal, M. Cappadonia, M. Lehman, "Investigation of the Proton Transport in Nafion® Membranes as a Function of Direction, Temperature and Relative Humidity", Ionics, Volume 2, pg. 102–106 (1996)]. The room temperature ionic conductivity was measured as described above and the reported room temperature ionic conductivity is the average of these three measurements (Table 1). The high temperature ionic conductivity was measured as described above except the ionomer that was brushed on the GDM was Nafion 1100 instead of that described above. The conductivity and hydration results are consistent with those widely reported in the literature for this commercial material [see, for example, T. Zawodinski, C. Derouin, S. Radzinski, R. Sherman, V. Smith, T. Springer and S. Gottesfeld, Journal of the Electrochemical Society, Volume 140, No. 4, 1041–1047 (1993)], confirming that the measurement technique is satisfactory.

COMPARATIVE EXAMPLE B–F

The data from Table 1 in WO 00/52060 for equivalent weights 1100, 980, 834 and 785 is reported directly as Comparative Example B, C, D, and E, respectively. Comparative Example F in Table 1 reports the data directly from inventive Example 9 of WO 00/52060. The conductivity and water uptake reported in WO 00/52060 were obtained using essentially the same procedure as that used here, so the data is directly comparable to the Example 5 and 6. The conductivity is substantially higher, and the degree of hydration substantially lower for the instant inventions of this application relative to the prior art of these Comparative Examples.

COMPARATIVE EXAMPLE G

A sample was prepared according to the procedure given in Example 1 of co-pending application to Wu, et. al., entitled Low Equivalent Weight Ionomers. A membrane was formed from this polymer using the procedure described above. This membrane was very fragile compared to those in Example 5 and 6. The equivalent weight, degree of hydration and room temperature conductivity of this membrane were measured (Table 1). The equivalent weight of this Comparative Example is approximately the same as the instant invention illustrated in Examples 5 and 6. These results show that for a given equivalent weight, the instant invention of this application has improved physical stability when hydrated, a substantially higher conductivity and a substantially lower degree of hydration compared to the prior art illustrated in this Comparative Example.

TABLE 1

Equivalent Weight, Conductivity and Hydration of Inventive and Comparative Examples

|  | Equivalent Weight (eq./g) | Degree of Hydration (%) | Mean Conductivity (S/cm) |
|---|---|---|---|
| Example 5 | 689 | 74.8 | 0.234 |
| Example 6 | 691 | 74.8 | 0.212 |
| Comparative Example A | 1104 | 16.82 | 0.083 |
| Comparative Example B | 1100 | 25 | 0.0902 |
| Comparative Example C | 980 | 27.1 | 0.1193 |
| Comparative Example D | 834 | 53.1 | 0.1152 |
| Comparative Example E | 785 | 79.2 | 0.0791 |
| Comparative Example F | 1156 | 15 | 0.065 |
| Comparative Example G | 698 | 118.5 | 0.145* |

*Average of only two measurements. Sample tore after second measurement, making a third measurement impossible.

COMPARATIVE EXAMPLE H

A sample was prepared according to the procedure described in Example 2 of co-pending application to Wu et. al., entitled Low Equivalent Weight Ionomers. A membrane of this polymer was prepared as described above. This polymer was found to have an equivalent weight of 810 and a degree of hydration of 42.3%. The high temperature conductivity of this sample was measured, and compared to that of Example 6, and Comparative Example A. Results show that the conductivity of the inventive polymer disclosed here is higher under all measured conditions than both of the Comparative Examples.

TABLE 2

High Temperature Ionic Conductivity Results at Various Temperatures and Relative Humidities
Mean Ionic Conductivity (S/cm)

|  | 80° C. 20% RH | 80° C. 80% RH | 120° C. 10% RH | 120° C. 40% RH |
|---|---|---|---|---|
| Comparative Example A | 0.003 | 0.044 | 0.001 | 0.0019 |
| Comparative Example H | 0.006 | 0.057 | 0.003 | 0.036 |
| Example 6 | 0.014 | 0.081 | 0.011 | 0.066 |

COMPARATIVE EXAMPLE I

A sample was prepared according to the procedure described in Example 5 of co-pending application to Wu et. al., entitled Low Equivalent Weight Ionomers. This polymer was found to have an equivalent weight of 838 and a degree of hydration of 36.7%.

EXAMPLE 7 AND COMPARATIVE EXAMPLE J AND K

Membrane electrode assemblies (MEAs) were made and tested to demonstrate the utility of instant invention for use in fuel cells. Two corresponding Comparative Examples were also prepared. The first, Comparative Example J, used a commercially available MEA similar to the ones prepared here. The second MEA, Comparative Example K, was prepared using the ionomer of Comparative Example I. Comparative Example K and Example 7 were prepared in the same way, except using different ionomers, the former from Comparative Example H, the latter from Example 2. The MEAs of these two samples were prepared for testing as follows: the ionomer in its hydrolyzed and acidified form was first solubilized in ethanol to form a solution containing 10% ionomer. This solution was then impregnated into a 22.5 micron thick support of ePTFE according to the teachings of Bahar, et. al. in U.S. Pat. No. RE37,307. The ePTFE was fixed in a 10-in embroidery hoop. The ionomer solution was painted on both sides of the ePTFE and then dried with a hair drier to remove the solvent. The painting and drying steps were repeated 2 more times. The ePTFE and the embroidery hoop were then placed into a solvent oven at 180° C. for 8 minutes. The sample was then removed and allowed to cool to room temperature. One more coat of ionomer solution was painted on both sides. The sample was placed back into the oven at 180° C. for 8 minutes. The sample was then removed from the oven and taken off of the embroidery hoop. The ePTFE/ionomer composite membrane was transparent, indicating substantially complete impregnation of the support by the ionomer.

An electrode containing 0.4 mg Pt/cm$^2$ and available from W. L. Gore & Associates, Inc. as part of its MEA bearing the designation Primea® 5510 (available from Japan Gore-Tex Inc., Japan) was laminated to both sides of the composite membrane. The electrode was first laid down over an 0008 inch thick ePTFE bottom sheet. The composite membrane was then laid down over the electrode, and another electrode was laid down over the membrane. Then a 0.005 inch thick ePTFE top sheet was laid down over the electrode. The assembly was pressed at 160° C. at 15 tons of pressure for 3 minutes, then the top and bottom ePTFE sheets were peeled off and discarded.

Comparative Example J used a PRIMEA® membrane electrode assembly Series 5510, commercially available W. L. Gore and Associates. This assembly used the same electrodes as in Example 7 and Comparative Example K and a similar ePTFE reinforcement in the electrolyte. The only substantive difference between Example 7 and Comparative Example I and J, then, was the ionomer in the electrolyte.

Cells using the three MEAs were assembled anode side first. A silicone-coated fiberglass gasket 0.007 inches thick with an inner window of 52.5 cm$^2$ was first placed down on top of a quadruple serpentine graphite anode flow field available from Fuel Cell Technologies (50 cm$^2$, 8 bolt fuel cell test hardware available from Fuel Cell Technologies was used). On top of the silicone-coated fiberglass gasket was placed a 0.0012 inch thick OL-12 spacer (Mylar film available from DuPont) with an inner window of 52.5 cm$^2$ aligned with the inner window of the silicone-coated fiberglass gasket. Next, a single-sided Elat gas diffusion media (GDM) available from E-Tek, having a 52 cm$^2$ area and being about 0.014 to 0.015 inches thick, was placed inside the inner windows of the silicone-coated fiberglass gasket and the spacer with the carbon side facing up. Next, a 0.0012 inch thick OL-12 sub-gasket having an inner window of 45 cm$^2$ was placed on top of the GDM, followed by the MEA. This gasket reduced the active area of the cell to 0.45 cm$^2$. The above steps were repeated in the opposite order on top of the MEA. Once an MEA "sandwich" was created, a cathode flow field (same as the anode flow field described above) was placed on top. The bolts were lubricated with Krytox grease (available from DuPont) and tightened in a star pattern in 5 in-lb bolt increments until each bolt achieved 75 in-lb of torque. The components used yielded an active area compression of 150 to 200 psi.

The test station used was a Globe Tech gas unit with a Scribner 890 load. Three-liter humidification bottles were used on the anode and cathode, and all lines coming into the cell were heat traced (heated along their length). Once the cell was hooked up to the test station, the fuel gasses were applied ($H_2$ on anode at 1.3 stoichiometry and air on cathode at 2.0 stoichiometry). The cell was then set to 60° C. and both the anode and cathode bottles were set to 60° C. as well. The back pressure was kept at 0 psig on both sides. Once the temperatures came up to their respective set points, an automatic cycling program was run to "break in" the cell. The conditions for this cycling program are set forth in Table 3.

TABLE 3

Start-up Procedure

| Voltage (V) | Time Spent at Each Condition (min) | Anode Humidification Temp. (C.) | Cathode Humidification Temp. (C.) | Anode RH* | Cathode RH** |
|---|---|---|---|---|---|
| 0.60 | 180 | 60 | 60 | 65% | 85% |
| 0.50 | 30 | 60 | 60 | 65% | 85% |
| 0.95 | 0.5 | 60 | 60 | 65% | 85% |
| 0.70 | 30 | 60 | 60 | 65% | 85% |
| 0.95 | 0.5 | 60 | 60 | 65% | 85% |
| 0.50 | 30 | 65 | 65 | 80% | 100% |
| 0.95 | 0.5 | 65 | 65 | 80% | 100% |
| 0.70 | 30 | 65 | 65 | 80% | 100% |
| 0.95 | 0.5 | 65 | 65 | 80% | 100% |
| 0.50 | 30 | 65 | 65 | 80% | 100% |
| 0.95 | 0.5 | 65 | 65 | 80% | 100% |
| 0.70 | 30 | 65 | 65 | 80% | 100% |
| 0.95 | 0.5 | 65 | 65 | 80% | 100% |
| 0.50 | 30 | 65 | 65 | 80% | 100% |
| 0.95 | 0.5 | 65 | 65 | 80% | 100% |
| 0.70 | 30 | 65 | 65 | 80% | 100% |
| 0.95 | 0.5 | 65 | 65 | 80% | 100% |
| 0.50 | 30 | 65 | 65 | 80% | 100% |
| 0.95 | 0.5 | 65 | 65 | 80% | 100% |
| 0.6 | 30 | 60 | 60 | 65% | 85% |

*Relative humidity assuming the anode humidifier is 65% efficient.
**Relative humidity assuming the cathode humidifier is 85% efficient.

Subsequent to finishing the cycling in Table 3, the cell was set to 80° C. cell temperature, 83° C. anode humidification, 51° C. cathode humidification, and 7 psig back pressure on both the anode and cathode. This yielded an anode inlet relative humidity (RH) of 75% and a cathode inlet RH of 25%, assuming the anode humidifiers are 65% efficient and the cathode humidifiers are 85% efficient. Once the temperatures and pressures reached their respective set points, an automatic "sensitivity protocol" was begun to test the MEA at various humidities. The "sensitivity protocol" is a program designed to determine how an MEA will respond to changing humidity conditions. It is particularly designed to show the effects of cell operation in relatively dry conditions.

TABLE 4

Fuel Cell Humidity Sensitivity Protocol and Voltage Results

| Step | Anode Humidity Temp. (C.) | Anode RH* | Cathode Humidity Temp. (C.) | Cathode RH** | Comparative Example J Mean Voltage | Comparative Example K Mean Voltage | Example 7 Mean Voltage |
|---|---|---|---|---|---|---|---|
| 1 | 83 | 75% | 51 | 25% | 0.685 | 0.686 | 0.705 |
| 2 | 86 | 100% | 65 | 50% | 0.684 | 0.682 | 0.704 |
| 3 | 86 | 100% | —† | dry | 0.658 | 0.682 | 0.696 |
| 4 | 83 | 75% | —† | dry | 0.596 | 0.606 | 0.667 |
| 5 | 83 | 50% | —† | dry | 0.552 | 0.570 | 0.643 |

*Relative humidity assuming the anode humidifier is 65% efficient.
**Relative humidity assuming the cathode humidifier is 85% efficient.
†Gas not humidified.

The protocol shown in Table 4 was followed. For each set of humidity conditions in Table 4, the cell was operated for two hours at a constant current density of 800 mA/cm$^2$. The voltage during this time was recorded, and the mean of this two-hour voltage-time data was calculated and recorded. Following the two-hour constant current hold, a polarization curve was recorded (not reported here). The polarization curve was obtained by measuring the steady state voltage after 10 or 20 minutes (longer time for dry cathode conditions) following sequential steps to each of the following current densities: 0.8, 1.0, 1.2, 1.4 A/cm$^2$. Then the current density was stepped to 0.8 A/cm$^2$ and the open circuit voltage (i.e., no load applied to the cell) was measured after 1.5 minutes. Then the rest of the polarization curve was obtained by measuring the steady state voltage after 10 or 20 minutes (longer time for dry cathode conditions) following sequential steps to 0.6, 0.4, 0.2 A/cm$^2$. Finally, the steady state voltage was measured after 5 or 13 minutes (longer time for dry cathode condition) at 0.1 A/cm$^2$. The temperatures of the anode and cathode humidity bottles were then changed to the next condition shown in Table 4 to achieve the next RH conditions. An 800 mA/cm$^2$ constant current was applied, the voltage-time data recorded, a mean voltage calculated, and a polarization curve taken as before. This procedure was repeated for each step in protocol shown in Table 4.

The average voltages observed for cells made from the inventive ionomers when tested under all 5 humidity conditions in Table 4 are significantly greater than the voltages previously obtainable using ionomers such as those used in Comparative Example J and K. The dramatic improvement obtained using the present invention under the conditions below 100% RH demonstrates the utility of the ionomer when it comprises part of an MEA.

EXAMPLE 8–9 AND COMPARATIVE EXAMPLE L

In order to demonstrate the significant differences between the inventive ionomeric polymer, a dynamic mechanical analysis (DMA) study was undertaken. Films were prepared as described above, except the starting polymer was in the sulfonyl fluoride form instead of the acid form. Thin films formed from the polymer product described in Example 1, 2 and Comparative Example G were prepared. These films were tested using a standard strain controlled rheometer as described below, with the results herein described as Examples 8, 9 and Comparative Example L, respectively.

Figure 3:
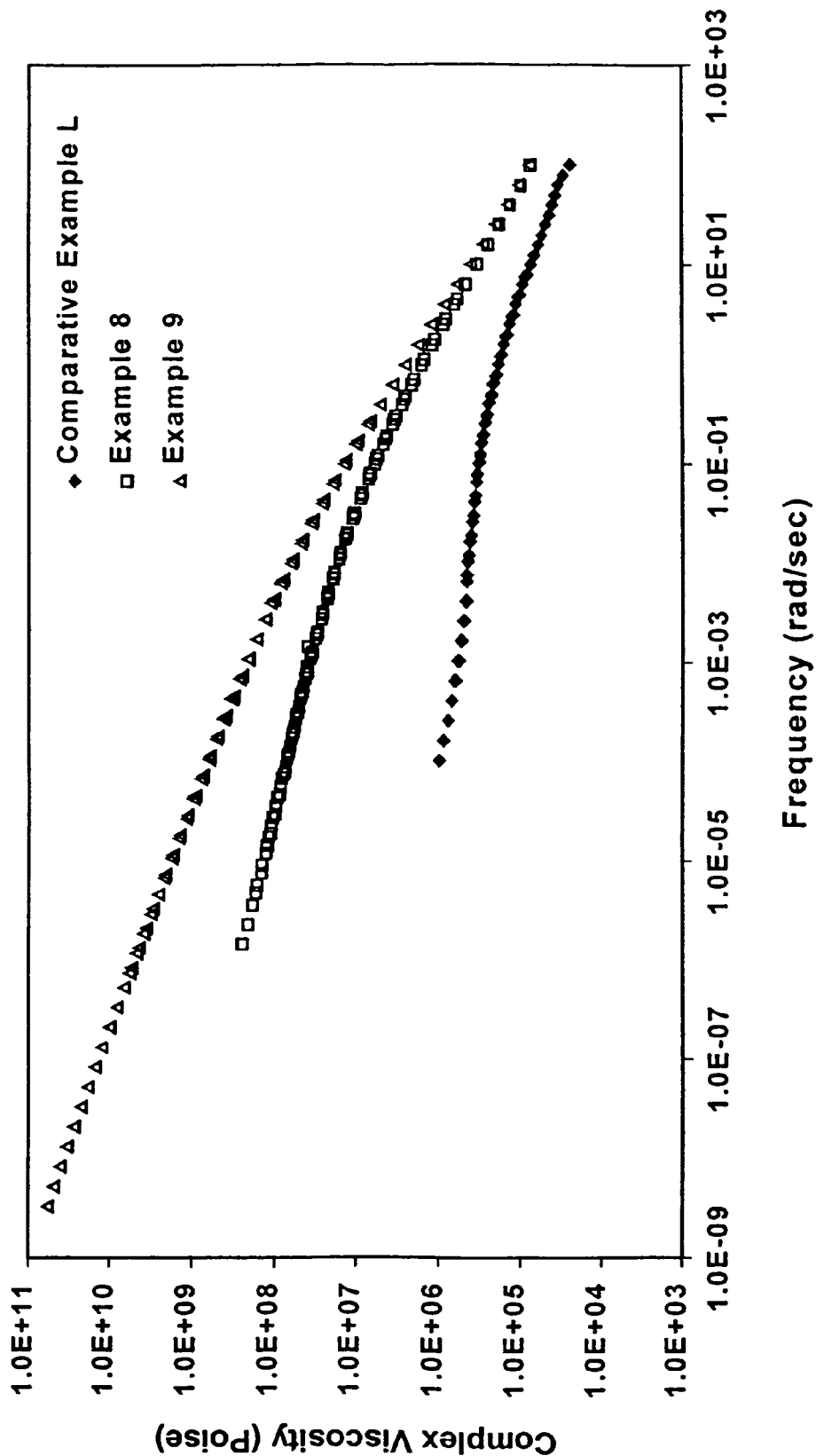
FIG. 3 shows the results of a dynamic mechanical analysis study of an exemplary embodiment of the inventive ionomers showing the complex viscosity as a function of shear rate.

The dynamic mechanical response was tested on a Rheometrics Scientific Ares LS-M Rheometer (Piscataway, N.J.) using the standard time-temperature superposition approach, as described in many standard texts on polymer viscoelasticity, for example, in J. D Ferry, *Viscoelastic Properties of Polymers*, 3$^{rd}$ *Edition*, J. Wiley & Son, 1980. Specifically, 25 mm diameter solid thin films of ~1–2 mm thickness were tested in a parallel plate geometry in a nitrogen atmosphere. Frequency sweeps between 0.1 and 100 rad/s were taken at 20 degree C. intervals at 5% strain for temperatures below 70 degrees C., and 10% strain for temperatures above 90 degrees C. The minimum and maximum temperatures were adjusted from sample to sample so that the data was within the range of the instrument transducer. For the three samples tested in these examples, the minimum temperatures were 30, 30, and 10 degrees C. for Examples 8, 9 and Comparative Example L, respectively; while the maximum temperatures were 150, 150, and 90 degrees C. The data from each temperature was reduced to a single master curve referenced at 30 degrees C. using the Rheometrics Scientific Orchestrator software, version 6.5.6. The results, plotted in FIG. 3 in terms of the complex viscosity as a function of shear rate, show that the inventive polymers described herein have a significantly higher viscosity at low shear rates. Without being bound by any particular theory, these results are consistent with (though not conclusive proof of) the presence of long chain branching in the inventive materials.

We claim:

1. A membrane electrode assembly comprising an anode and a cathode sandwiching a membrane comprising a fluorinated ionomer comprising at least
   (a) a substantially fluorinated backbone;
   (b) pendant groups derived from an ionomeric monomer of the formula

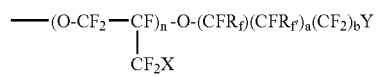

where X is F, Cl or Br or mixtures thereof; n is an integer equal to zero, one or two; $R_f$ and $R_{f'}$ are independently selected from the group of F, Cl, perfluoroalkyl radical, and chloroperfluoroalkyl radical; Y is an acid group or a functional group convertible to an acid group; a is zero or an integer greater than zero; and b is an integer greater than zero; and (c) pendant groups derived from a vinyl ether monomer that has at least two vinyl ether groups of the form, $CA_2=CB-O-$, where the vinyl groups are separated by greater than four atoms; A is independently selected from the group containing F, Cl, and H; and B is independently selected from F, Cl, H and $OR_i$, where $R_i$ is a branched or straight chain alkane that may be partially, substantially or completely fluorinated or chlorinated;

wherein the concentration of the pendant groups derived from the ionomeric monomer and the vinyl ether monomer is between about 10 mole percent and about 45 mole percent of the final product, and wherein the concentration of the pendant groups derived from the vinyl ether monomer is present in the final product between about 0.05 and about 2 mole percent.

2. A membrane electrode assembly as defined in claim 1 wherein said membrane further comprises a porous support and the fluorinated ionomer is impregnated within said porous support.

3. A membrane electrode assembly as defined in claim 2 wherein said porous support is expanded polytetrafluoroethylene.

4. A membrane electrode assembly as defined in claim 2 wherein said fluorinated ionomer substantially completely impregnates said porous support.

5. An electrochemical cell with a cathode feed comprising an oxidizing species, an anode feed comprising a reducing species relative to that in the cathode feed, said electrochemical cell comprising a membrane electrode assembly as defined in claim 1.

6. An electrochemical cell with a cathode feed comprising an oxidizing species, an anode feed comprising a reducing species relative to that in the cathode feed, said electrochemical cell comprising a membrane electrode assembly as defined in claim 2.

7. An electrochemical cell with a cathode feed comprising an oxidizing species, an anode feed comprising a reducing species relative to that in the cathode feed, said electrochemical cell comprising a membrane electrode assembly as defined in claim 3.

8. An electrochemical cell with a cathode feed comprising an oxidizing species, an anode feed comprising a reducing species relative to that in the cathode feed, said electrochemical cell comprising a membrane electrode assembly as defined in claim 4.

9. A membrane electrode assembly comprising an anode, a cathode and a membrane, wherein at least one of said anode and cathode comprises the fluorinated ionomer of claim 1.

10. An electrolytic cell comprising a membrane as a membrane comprising a fluorinated ionomer comprising at least (a) a substantially fluorinated backbone;

(b) pendant groups derived from an ionomeric monomer of the formula

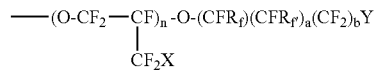

where X is F, Cl or Br or mixtures thereof; n is an integer equal to zero, one or two; $R_f$ and $R_{f'}$ are independently selected from the group of F, Cl, perfluoroalkyl radical, and chloroperfluoroalkyl radical; Y is an acid group or a chloroperfluoroalkyl radical; Y is an acid group or a functional group convertible to an acid group; a is zero or an integer greater than zero; and b is an integer greater than zero; and (c) pendant groups derived from a vinyl ether monomer that has at least two vinyl ether groups of the form, $CA_2\!=\!CB\!-\!O\!-\!$, where the vinyl groups are separated by greater than four atoms; A is independently selected from the group containing F, Cl, and H; and B is independently selected from F, Cl, H and $OR_i$, where $R_i$ is a branched or straight chain alkane that may be partially, substantially or completely fluorinated or chlorinated;

wherein the concentration of the pendant groups derived from the ionomeric monomer and the vinyl ether monomer is between about 10 mole percent and about 45 mole percent of the final product, and wherein the concentration of the pendant groups derived from the vinyl ether monomer is present in the final product between about 0.05 and about 2 mole percent.

* * * * *